United States Patent [19]

McConkey

[11] Patent Number: 4,957,295

[45] Date of Patent: Sep. 18, 1990

[54] HEAD MOVEMENT INDICATING DEVICE AND METHOD

[76] Inventor: Sam A. McConkey, 1919 Lathrop St., Fairbanks, Ak. 99701

[21] Appl. No.: 410,103

[22] Filed: Sep. 20, 1989

[51] Int. Cl.⁵ .............................................. A63B 69/36
[52] U.S. Cl. .............................. 273/183 B; 273/183 E; 273/14
[58] Field of Search ............ 273/183 B, 183 E, 190 R, 273/190 A, 29 A, 26 C; 350/452; 351/171

[56] References Cited

U.S. PATENT DOCUMENTS

| | | | |
|---|---|---|---|
| 1,637,406 | 8/1927 | Brumder | 273/183 B |
| 2,929,631 | 3/1960 | Gillon | 273/183 E |
| 3,228,696 | 1/1966 | Hull | 273/183 B |
| 3,468,545 | 9/1969 | Anderson | 273/183 E |
| 3,487,549 | 1/1970 | Engesser | 273/183 B |
| 3,628,854 | 12/1971 | Jampolsky | 350/452 |
| 3,904,281 | 9/1975 | Jampolsky | 350/452 |

Primary Examiner—George J. Marlo
Attorney, Agent, or Firm—Stanley J. Price, Jr.

[57] ABSTRACT

An optical device is provided for determining the movement of the head of a user of the device relative to a fixed object that the user is viewing while performing a specific physical task. The optical device includes a pair of spectacles that are worn by the user. A flexible optical altering membrane substantially smaller than the lenses of the spectacles is adhesively secured to each lens of the spectacles in the area of the lens through which the user normally views the object. The optical altering membrane is selectively removable and reattachable to the spectacle lenses. The membrane causes the object to appear to the user to be in a first position when viewed through the optical altering membrane and to "jump" to a second position when viewed through portions of the spectacle lenses not covered by the membrane.

20 Claims, 2 Drawing Sheets

HEAD MOVEMENT INDICATING DEVICE AND METHOD

BACKGROUND OF THE INVENTION

1. Field of the Invention

This invention relates to a method and apparatus for determining the head movement of a user of the device while the user performs certain specified physical tasks such as striking a golf ball or other sports and non-sports activities.

2. Description of the Prior Art

Many types of devices have been suggested for assisting a golfer in attempting to keep his or her head still while striking a golf ball. U.S. Pat. No. 1,637,406, U.S. Pat. 3,871,104 and U.S. Pat. 4,168,111 all disclose glasses that have been occluded to provide restricted vision for golf practice with the objective of assisting the golfer to keep his or her head still. U.S. Pat. No. 4,022,475 discloses a device which is attached directly to the lens of a pair of spectacles to assist in training a golfer to keep his or her head still. Similarly, U.S Pat. No. 3,228,696 and U.S. Pat. No. 3,487,549 show sighting devices directly associated with the lenses of spectacles for assisting a golfer in training.

All of the foregoing devices have shortcomings in that they require permanent modification of the golfer's spectacles to accomplish their purpose. Further, some of the devices add weight to the spectacles which make them impractical.

I have found that utilization of flexible optic altering membranes such as disclosed in U.S. Pat. No. 3,628,854 and U.S. Pat. No. 3,904,281 can produce a device which will not only assist a golfer in keeping his or her head still while striking the golf ball, but can also be useful in other sport activities such as croquet, billiards, T-ball, and shooting, as well as military uses where it is essential for those performing certain tasks to keep their heads still while performing the physical tasks.

SUMMARY OF THE INVENTION

In accordance with the present invention there is provided an optical device for determining movement of the head of a user of the device relative to a fixed object that the user is viewing while performing a specific task. The device comprises a pair of spectacles that are worn by the user. A flexible optical altering membrane substantially smaller than the lenses of the spectacles is adhesively secured to each lens of the spectacles in the area of the lens through which the user normally views the fixed object. The optical altering membrane is selectively removable and reattachable to the spectacle lenses. The optical altering membrane causes the fixed object to appear to the user in a first position when viewed through the optical altering membrane and to "jump" to a second position when viewed through the portions of the spectacle lenses not covered by the membrane.

Further in accordance with the present invention there is provided a method of determining movement of the head of a viewer relative to a fixed object that is being viewed by the viewer while performing a specific task. The method includes the steps of adhesively securing a flexible optical altering membrane that is selectively removable and reattachable and is substantially smaller than the lenses of a pair of spectacles onto each lens of the spectacles in the area of the lens through which the viewer normally views the fixed object. The spectacles are positioned on the viewer for viewing the fixed object and thereafter the viewer notes whether the image of the fixed object appears to the viewer to "jump" from the first position viewed to a second position indicating that the fixed object is no longer being viewed through the optical altering membrane and that the viewer's head has moved while performing the task.

Still further in accordance with the present invention there is provided an optical device for determining movement of the head of a golfer during the golf stroke relative to the golf ball the golfer is about to strike. The device includes a pair of unifocal spectacles worn by the golfer. A flexible optical altering membrane substantially smaller than the lenses of the spectacles is adhesively secured to each lens of the spectacles in the area of the lens through which the golf ball is viewed by the golfer. The optical altering membrane is selectively removable and reattachable to the spectacle lenses. The optical altering membrane causes the golf ball to appear to the golfer to be in a first position when viewed through the optical altering membrane and to "jump" to a second position when viewed through the portions of the spectacle lenses not covered by the membrane. Movement of the golfer's head will thereby be detected if the golf ball appears to the golfer to "jump" before it is struck by the golfer.

Accordingly, the principle object of the present invention is to provide an apparatus for determining movement of the head of a user relative to a fixed object that the user is viewing while the user is performing a specific physical activity.

A further object of the present invention is to provide a method for determining movement of the head of a viewer relative to a fixed object that is being viewed by the viewer while the viewer performs a specific physical task.

A further object of the present invention is to provide an optical device for determining movement of the head of a user relative to a fixed object that the user is viewing by temporarily modifying spectacles that can be utilized for other purposes when not so modified.

These and other objects of the present invention will be more completely disclosed and described in the following specification, the accompanying drawings, and the appended claims.

BRIEF DESCRIPTION OF THE DRAWINGS

FIG. 6 is a side view of the spectacles of FIG. 5 showing the position of the membrane on the lenses of the spectacles.

DESCRIPTION OF THE PREFERRED EMBODIMENT

Figure 1:
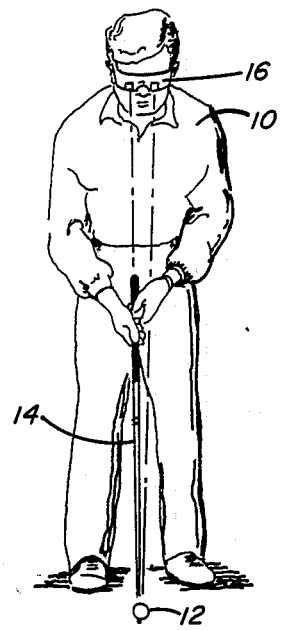
FIG. 1 is a schematic representation of a golfer wearing the optical device of the present invention.

Referring to the drawings, FIG. 1 shows a golfer 10 positioned to strike a golf ball 12 with a putter 14. The golfer 10 is wearing spectacles 16 modified to practice the present invention.

Figure 2:
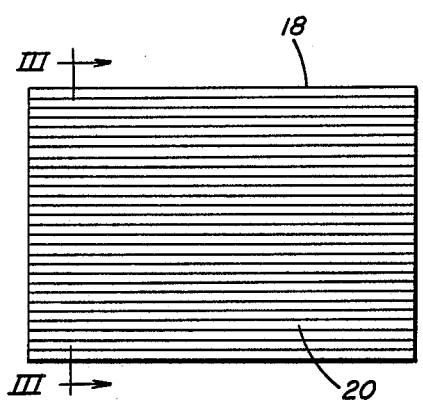
FIG. 2 is a top plan view of one form of flexible optical altering membrane utilized with the present invention.

FIG. 2 shows a flexible optical altering membrane 18 which has embossed on one face 20 of the membrane a plurality of parallel, narrow prisms of a preselected refractive power of the type known as a Fresnel prism. This type of flexible optical altering membrane is disclosed in detail in U.S. Pat. No. 3,628,854 granted to Arthur Jampolsky on Dec. 21, 1971, and is sold commercially by Vision Care/3M of St. Paul, Minn. 55144 under the trademark "Press-on" Optics. As disclosed in Pat. No. 3,628,854, the type of plastic material utilized is selected so that the membrane fully conforms to the curved surface of an ordinary spectacle lens, or any part of it, under ordinary finger pressure. The plastic material and the nature of its surface is selected so that it will adhere to the lens surface by one or more of the following phenomena: vacuum, electrostatic attraction, presence of an interfacial pressure sensitive adhesive, or inherent adhesive (intermolecular) forces between the membrane material and the lens material.

While the membrane disclosed in U.S. Pat. No. 3,628,854 shows a prismatic surface on the membrane, a similar membrane can be utilized in the present invention which has magnifying power rather than a prismatic surface depending upon the activity being pursued. The magnifying membrane will be formed of the same material as the prismatic membrane and will adhere to the lens of the spectacle by finger pressure and may be easily removed from the lens of the spectacle when it is not desired to utilize the optic device of the present invention.

Figure 4:
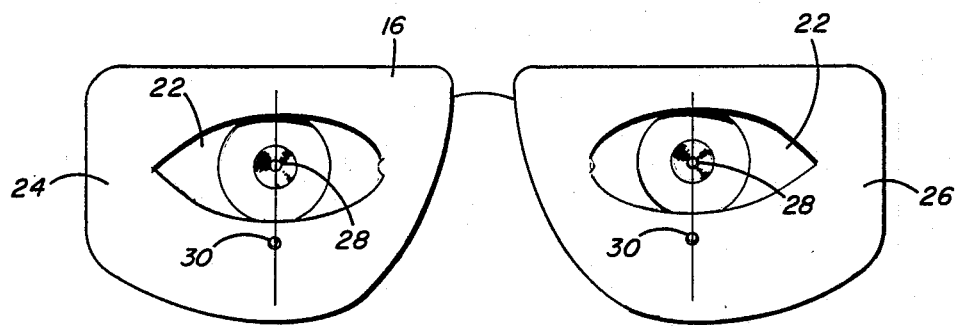
FIG. 4 is a diagrammatic illustration of the lenses of a pair of spectacles positioned over the eyes of the user.

As shown diagrammatically in FIG. 4, the spectacles 16 are positioned over the eyes 22 of a user of the device. Lenses 24 and 26 of the spectacle 16 are temporarily marked by means of a grease pencil or other removable mark to indicate the position of the pupil of the eye when the spectacles 16 are on the user. Marks 30 are then temporarily affixed a specified distance from and direction relative to marks 28 depending on the type of activity to be performed by the user of the optical device of the present invention. It has been found that for most golf applications, marks 30 should be approximately one-fourth inch below and in line with marks 28 on the respective lenses 24 and 26.

Figure 3:
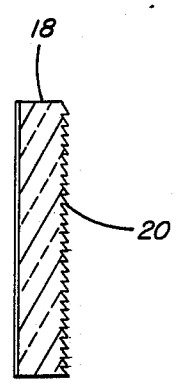
FIG. 3 is a sectional view of the membrane taken along line III—III of FIG. 2.
Figure 5:
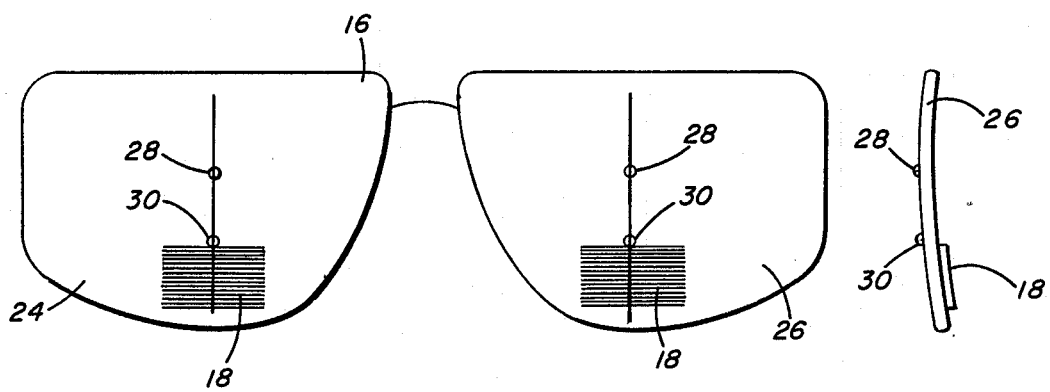
FIG. 5 is a diagrammatic view of the spectacles of FIG. 4 having the flexible optical altering membrane affixed thereto.

As shown in FIG. 5 and FIG. 6, when the positions have been determined by marks 28 and 30, the top edge of the flexible optical altering membrane 18 is positioned adjacent to and below mark 30 on the inside of the spectacle lens surface 24 or 26. The membrane 18 is positioned so that its smooth surface contacts the lens and so that its prismatic surface 20 faces toward the user. The membrane 18 is positioned in the position shown in FIG. 3 so that the sloping surfaces of the prisms face upwardly and the perpendicular surfaces of the prisms face downwardly.

I have found that the size of the membranes 18 may be varied depending upon the degree of head movement that is permissible in executing any specific physical task. When a greater amount of head movement is permissible, the membrane 18 may be larger. For example, I have found that when executing a golf stroke with a driver or a fairway wood, the membrane 18 should be approximately three-quarters of an inch in length and approximately one-half inch wide. When executing a full shot with an iron, the membrane 18 should be approximately five-eighths inch long and three-eighths inch in width. When practicing with a putter, or chipping the ball, the membrane 18 should be from approximately three-eighths inch long and one-quarter inch in width to one-half inch in diameter.

Figure 7:
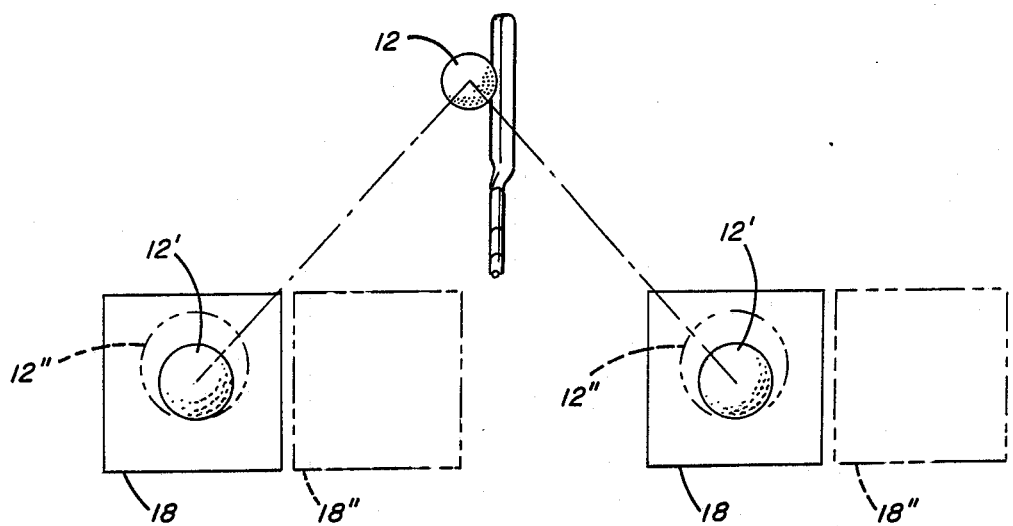
FIG. 7 is a diagrammatic view illustrating the manner in which a golf ball appears to "jump" when the golfer moves his or her head while wearing the optical device of the present invention.

Referring now to FIG. 7, there is diagrammatically illustrated the position of the golf ball 12 which is being viewed at 12' through the separate membranes 18 affixed to the spectacle lenses. If the golfer moves his head to the right, the membranes 18 move to the positions shown at 18". When the golfer's head so moves, he will no longer view the golf ball 12 through membrane 18 but will see the golf ball appear to enlarge and move slightly away from him as illustrated in broken lines at 12". This phenomenon I have labeled as the "jump" of the object when the optical characteristics through which it is viewed change and the position and size of the object therefore appear to change. This phenomenon is similar to the manner in which objects appear to "jump" or move when viewed through the different portions of bifocal lenses utilized for visual correction.

Figure 8:
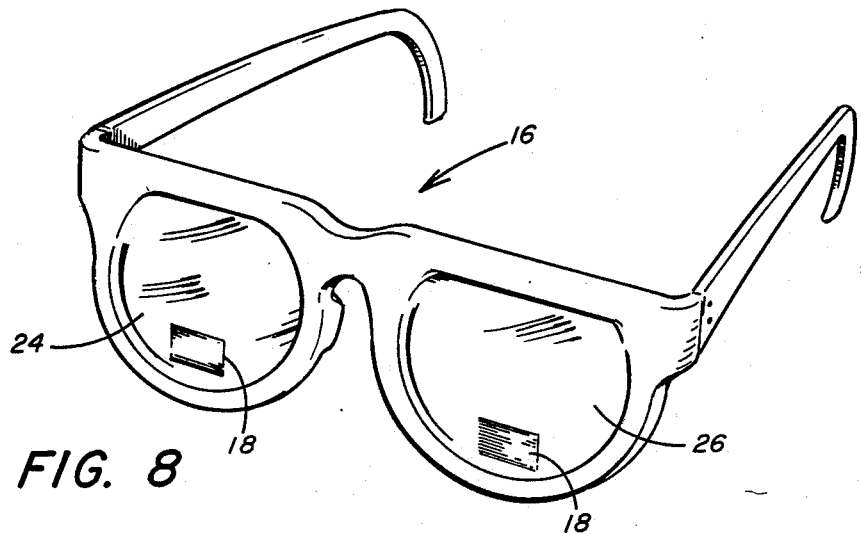
FIG. 8 is a perspective view of a pair of spectacles with the flexible optical altering membrane attached to each lens.

FIG. 8 illustrates a perspective view of a pair of spectacles 16 having the membrane 18 attached to the lenses 24 and 26, respectively.

It should be understood that I have, for illustrative purposes, described the optical device of the present invention as it would be utilized for training a golfer to keep his or her head still while executing a golf stroke. This use of the optical device of the present invention is only one use that may be assigned to the invention. Any physical task which requires keeping the head still while performing the task may be performed while utilizing the optical device of the present invention to determine whether the user's head remains stationary. As indicated earlier, many sporting and nonsporting activities can effectively utilize the optical device of the present invention.

According to the provisions of the Patent Statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. An optical device for determining movement of the head of a user relative to a an object that the user is viewing while performing a specific task comprising:
   a pair of spectacles worn by the user;
   a flexible optical altering membrane substantially smaller than the lenses of said spectacles being adhesively secured to each lens of said spectacles in the area of said lens through which the user normally views said object, said optical altering membrane being selectively removable and reattachable to said spectacle lenses;
   said optical altering membrane causing said object to appear to the user to be in a first position when viewed through said optical altering membrane and to "jump" to a second position when viewed through the portions of said spectacle lenses not covered by said membrane.

2. The optical device of claim 1 wherein said optical altering membrane is a prismatic membrane.

3. The optical device of claim 1 wherein said optical altering membrane has a plurality of parallel, narrow prisms of a preselected refractive power on one surface to form a Fresnel prism.

4. The optical device of claim 1 wherein said optical altering membrane forms an area on said lenses having a different magnification power than said lenses of said spectacles.

5. The optical device of claim 1 wherein said optical altering membrane is secured to said lenses by means of a pressure sensitive adhesive.

6. The optical device of claim 1 wherein said spectacle lenses are unifocal lenses.

7. The optical device of claim 1 wherein the size of said optical altering membrane is determined by the degree of user head movement that may be tolerated in performing said task.

8. The method of determining movement of the head of a viewer relative to an object that is being viewed by the viewer while performing a specific task comprising the steps of:
adhesively securing a flexible optical altering membrane that is selectively removable and reattachable and is substantially smaller than the lenses of a pair of spectacles onto each lens of said spectacles in the area of said lens through which the viewer normally views said object;
positioning said spectacles on said viewer for viewing said object; and
thereafter noting whether the image of said object appears to the viewer to "jump" from the first position viewed to a second position indicating that the object is no longer being viewed through said optical altering membrane and that the viewer's head has moved while performing said task.

9. The method of claim 8 wherein said optical altering membrane is a prismatic membrane.

10. The method of claim 8 wherein said optical altering membrane has a plurality of parallel, narrow prisms of a preselected refractive power on one surface to form a Fresnel prism.

11. The method of claim 8 wherein said optical altering membrane forms an area in said lenses having a different magnification power than said lenses of said spectacles.

12. The method of claim 8 wherein said optical altering membrane is secured to said lenses by means of a pressure sensitive adhesive.

13. The method of claim 8 wherein said spectacle lenses are unifocal lenses.

14. The method of claim 8 wherein the size of said optical altering membrane is varied depending upon the degree of viewer head movement that can be tolerated in performing a particular task.

15. An optical device for determining movement of the head of a golfer during the golf stroke relative to the golf ball the golfer is about to strike comprising:
a pair of unifocal spectacles worn by said golfer;
a flexible optical altering membrane substantially smaller than the lenses of said spectacles being adhesively secured to each lens of said spectacles in the area of said lens through which said golf ball is viewed by said golfer, said optical altering membrane being selectively removable and reattachable to said spectacle lenses;
said optical altering membrane causing said golf ball to appear to said golfer to be in a first position when viewed through said optical altering membrane and to "jump" to a second position when viewed through the portions of said spectacle lenses not covered by said membrane whereby movement of the golfer's head will be detected if said golf ball appears to said golfer to "jump" before it is struck by said golfer.

16. The optical device of claim 15 wherein said optical altering membrane has a plurality of parallel, narrow prisms of a preselected refractive power on one surface to form a Fresnel prism.

17. The optical device of claim 15 wherein said optical altering membrane forms an area on said lenses having a different magnification power than said lenses of said spectacles.

18. The optical device of claim 15 wherein said optical altering membrane is secured to said lenses by means of a pressure sensitive adhesive.

19. The optical device of claim 15 wherein said spectacle lenses are unifocal lenses.

20. The optical device of claim 15 wherein the size of said optical altering membrane is determined by the degree of golfer head movement that may be tolerated in performing a particular stroke.

* * * * *